Patented Feb. 7, 1950

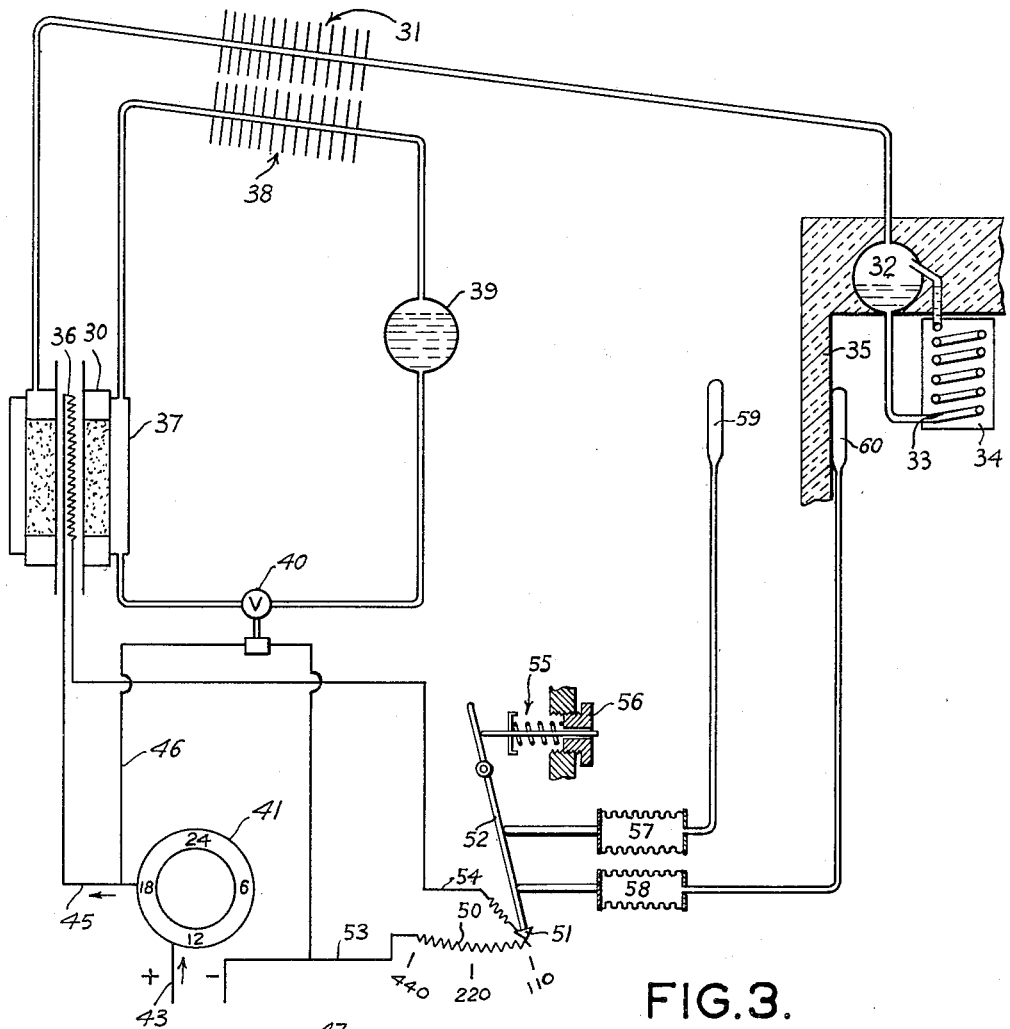
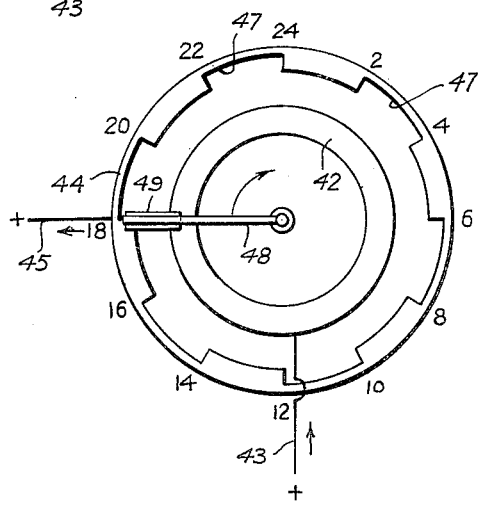
FIG.3.
FIG.4.

2,496,459

UNITED STATES PATENT OFFICE 2,496,459

ABSORPTION OR ADSORPTION REFRIGERATION

Nils Erland af Kleen, Stockholm, Sweden, assignor to Kleen Refrigerator, Inc., Hoboken, N. J., a corporation of Delaware Application June 6, 1942, Serial No. 446,093

2 Claims. (Cl. 62—5)

This invention relates to new and useful improvements in absorption or adsorption refrigerating systems of the type operating with solid absorbent or adsorbent material, and a refrigerant.

For convenience, the invention will be described in connection with an absorption system of refrigeration, but it is to be understood that the use of the terms "absorbent," "absorb," etc. in the following description and appended claims is intended to include the corresponding terms in connection with an adsorption system of refrigeration.

One of the primary objects of the invention is to maintain substantially constant the efficiency of a refrigerating system of this type during different operating conditions by employing a plurality of solid absorbents having the characteristics of absorbing and liberating the refrigerating fluid within respectively different ranges of temperatures, other conditions being the same.

Another object of the invention is to operate an intermittent absorption refrigerating system of the solid absorbent type with a plurality of absorbents having for the same operating conditions of the system the characteristics of absorbing and liberating the refrigerant fluid within the respectively different ranges of temperatures and to provide means for selectively limiting the temperature range through which the boiler-absorber or generator-absorber containing such absorbents is heated to regulate the number of absorbents which become active in a given generating period.

Figure 1:
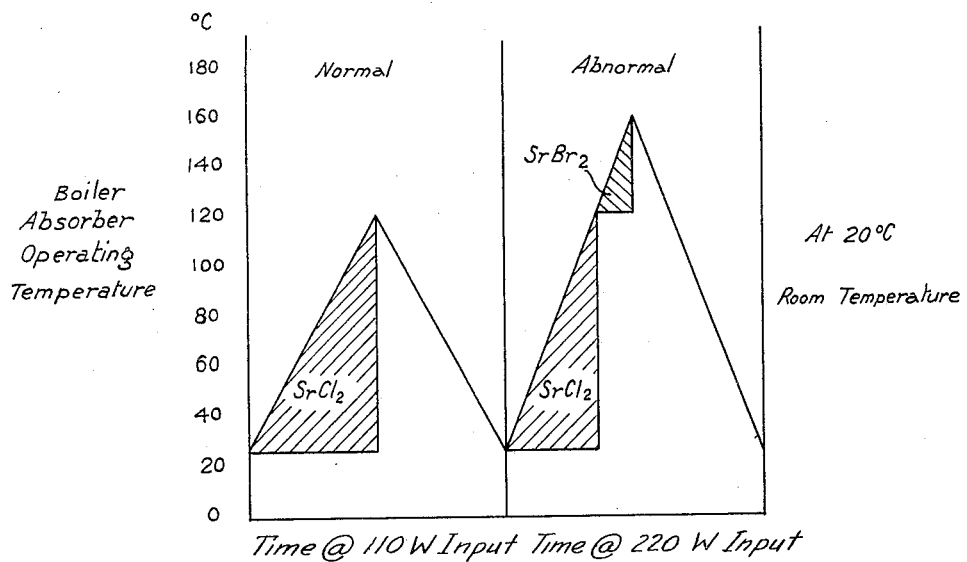
Figure 2:
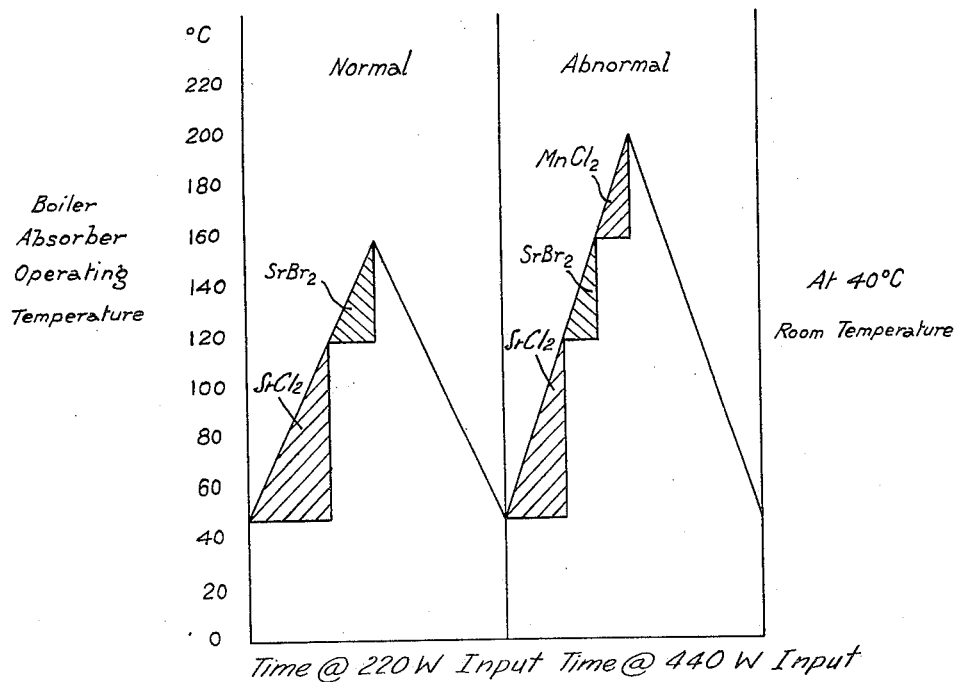

The above and other objects together with the advantages of the invention will become more apparent from the following description when taken in conjunction with the accompanying drawings in which Fig. 1 is a time-temperature chart showing for a predetermined condensation temperature of the refrigerant two temperature curves as measured at the outside shell of the boiler-absorber or generator-absorber of an intermittent absorption refrigerating unit charged with a plurality of absorbents having the characteristics of absorbing and liberating the refrigerating fluid within respectively different ranges of temperatures, other conditions being the same, and in which the boiler-absorber or generator-absorber is heated at respectively different rates per unit of time to regulate in accordance with the invention the number of such absorbents which become active during the generating period of the system;

Fig. 2 is a similar time-temperature chart but for another condensation temperature of the refrigerant and showing two temperature curves as measured at the outside shell of the boiler-absorber or generator-absorber in which the latter is heated at respectively different rates per unit of time for regulating in accordance with the invention the number of absorbents which become active during the generating period of the system;

Fig. 3 is a diagrammatic view of an intermittent absorption refrigerating unit operating with two or more different solid absorbents in accordance with the present invention, and Fig. 4 is an enlarged detail of the device controlling the heating and absorbing periods of the system shown in Fig. 3.

With refrigerating systems using a dry salt as the absorbent for ammonia or other refrigerating fluid employed, the vapor-solid equilibrium is within definite limits a function only of the pressure and temperature. In other words, to condense the refrigerant at a given condensation temperature corresponding to a predetermined vapor pressure in the system, the absorbent-refrigerant compound or charge must be heated up to a predetermined temperature and, to produce refrigeration at a given vaporization temperature of the refrigerant or evaporator temperature corresponding to a predetermined vapor pressure in the system, the absorbent-refrigerant compound or charge must be cooled to a predetermined temperature.

For example, to condense the refrigerant at condensation temperatures of 20° C. and 40° C., respectively, the following are the temperatures to which some well known absorbent-refrigerant compounds have to be heated:

| Compound | Condensation temperature of the refrigerant | |
|---|---|---|
| | 20° C. | 40° C. |
| | ° C. | ° C. |
| $CaCl_2.8NH_3(6NH_3)$ | 92 | 108 |
| $SrCl_2.8NH_3(7NH_3)$ | 82 | 98 |
| $SrBr_2.8NH_3(6NH_3)$ | 121 | 138 |
| $MnCl_2.6NH_3(4NH_3)$ | 138 | 165 |
| $CaCl_2.6CH_3NH_2(4CH_3NH_2)$ | 46 | 58 |
| $LiCl.3CH_3NH_2(3CH_3NH_2)$ | 95 | 112 |
| $MgCl_2.8CH_3NH_2(4CH_3NH_2)$ | 125 | 138 |

The figures in parentheses opposite each compound designate the amount of refrigerant that can safely be utilized for refrigeration purposes in a refrigerating system.

On the other hand, to produce refrigeration at —10° C. and at —20° C., respectively, the following are the temperatures to which the above mentioned absorbent-refrigerant compounds have to be cooled:

| Compound | Evaporation temperature of the refrigerant | |
| --- | --- | --- |
| | −10° C. | −20° C. |
| | ° C. | ° C. |
| CaCl₂.8NH₃ | 53 | 43 |
| SrCl₂.8NH₃ | 58 | 52 |
| SrBr₂.8NH₃ | 87.8 | 79 |
| MnCl₂.6NH₃ | 112 | 102 |
| CaCl₂.6CH₃NH₂ | 27 | 20 |
| LiCl.3CH₃NH₂ | 35 | 26 |
| MgCl₂.8CH₃NH₂ | 99 | 90 |

Thus, to liberate and condense at a given condensation temperature all of the refrigerant that can be utilized for refrigerant purposes, each absorbent-refrigerant compound has to be heated to a critical temperature which critical temperature is different for different absorbent-refrigerant compounds and, alternately, to reabsorb the aforesaid amount of refrigerant vapor to produce refrigeration at a given evaporator temperature, each absorbent-refrigerant compound has to be cooled to a critical temperature which critical temperature is also different for different absorbent-refrigerant compounds.

Due to the fact that the absorbent-refrigerant compound is a very poor heat conductor the boiler-absorber or generator-absorber containing the absorbent-refrigerant compound has to be overheated to insure that all of the compound inside the same shall be heated to the critical temperature. Similarly, the boiler-absorber has to be subcooled to insure that all of the compound is cooled to the critical temperature for a given vapor pressure. It has been found when using SrCl₂ as the absorbent and NH₃ as the refrigerant in an air-cooled absorption refrigerating system, that the boiler-absorber containing the compound SrCl₂.8NH₃ must be heated up to about 120° C. as measured at the outside shell to insure that all of the compound will be heated to the critical temperature and that at this boiler-absorber temperature, 7 mols. of NH₃ will be liberated and condensed at the highest condensation temperature at which the refrigerating system is operated.

Consequently, in controlling the operation of a refrigerating system of this type, it has been found advantageous to let the end temperatures of the boiler-absorber as measured at the outside shell thereof determine the heating and cooling periods, that is, to initiate the heating period when the boiler-absorber has been cooled to a predetermined minimum temperature determined by the ambient temperature and to terminate the heating period and simultaneously initiate the cooling period when the boiler-absorber has been heated to a predetermined maximum temperature independent of changes in condensation temperature.

Systems of this type have also been controlled by other means such as clock mechanisms that determine fixed heating-up periods and fixed cooling-down periods of the boiler-absorbers, or by devices operating to shut off the heat supply at a predetermined boiler-absorber temperature and to turn on the heat supply when the temperature in the evaporator has reached a certain increased value, or when a predetermined amount of liquid refrigerant has been collected in the evaporator.

However, in the operation of an absorption refrigerating system of this type, in view of the fact that an increasing load occasioned either by a rising room or ambient temperature or by an increased load on the evaporator will lower correspondingly the coefficient of performance of the system, it has been found advantageous to construct and design the system for its maximum coefficient of performance when operating at normal condition or low loads especially since such operating conditions will occur during the greater part of any operating year. For example, with a refrigerating system operating with SrCl₂ as the absorbent and NH₃ as the refrigerant, it has been found that at an ambient temperature of 20° C. and low load on the evaporator, the system has a coefficient of performance of about 35%. However, when operating at full capacity at this normal ambient temperature, the coefficient of performance of the system will be less and, when operating under full load and at a predetermined maximum ambient temperature, the refrigerating system will have a co-efficient of performance of about 25%.

As heretofore pointed out, different solid absorbents have respectively different pressure-temperature equilibria characteristics with respect to the same refrigerant or different refrigerants and a refrigerating system operating with any one of such absorbents will have the same co-efficient of performance as above mentioned in connection with SrCl₂ and NH₃. Consequently, by employing in a refrigerating system a plurality of such absorbents in connection with the same refrigerant and selectively controlling the number of such absorbents which become active at a given operating condition of the system, the high coefficient of performance of the system can be maintained substantially constant for all operating conditions.

If strontium chloride, strontium bromide and manganese chloride are utilized for example as the different absorbents and ammonia as the refrigerant in an intermittent absorption type unit, the operation of the unit can be so controlled that for a certain operating condition, such for example as a room temperature of about 20° C. and low load on the cabinet, the boiler-absorber will be heated up to a predetermined temperature during each generating period of the unit. For this operating condition, only the ammonia combining with strontium chloride will be liberated during each generating period and be reabsorbed during each absorbing period of the unit. Should now the load on the evaporator or the load in the cabinet increase and the room temperature remain unchanged, the boiler-absorber can be heated up to a higher end temperature during each generating period so that ammonia combining with strontium bromide will be liberated to supplement the amount of ammonia liberated from the strontium chloride.

This is graphically depicted in the diagram of Fig. 1 comprising two complete cycles of an intermittent unit at a room temperature of 20° C., one cycle for a low load on the evaporator and indicated by the legend "Normal" and the other cycle for a full load on the evaporator and indicated by the legend "Abnormal." For illustrative purposes, both cycles have been shown as being of the same duration but with respectively different rates of heat input; namely, 110 watts per hour indicated by the legend "110 W" for one cycle and 220 watts per hour indicated by the legend "220 W" for the other cycle. When heated at the rate of 110 watts, the boiler-absorber temperature will rise to about 120° C. as indicated by line $a$ during each generating period and, alternately, the boiler-absorber temperature will drop to about 26° C. as indicated by line $b$ during each absorbing period. For this boiler-absorber operating temperature range, only the refrigerant combining with $SrCl_2$ will be liberated during the generating periods and be reabsorbed during the absorbing periods. However, when heated at the rate of 220 watts, the boiler-absorber temperature will rise to about 160° C. as indicated by line $c$ during each generating period and, alternately, the boiler-absorber temperature will drop to about 26° C. indicated by line $d$ during each absorbing period. For this boiler-absorber operating temperature range, the refrigerant combining with $SrCl_2$ and also with $SrBr_2$ will be liberated during the generating periods and be reabsorbed during the absorbing periods.

If the room temperature rises from the normal to say 40° C., and the load either on the evaporator or in the cabinet remain normal, in view of the fact that at this higher room temperature more refrigeration will be required than at the lower room temperature of 20° C. to maintain the cabinet temperature substantially the same, the boiler-absorber end temperature can be raised sufficiently as shown in Fig. 2 to permit the liberation of the ammonia from both the strontium chloride and the strontium bromide. Should now a full load be placed upon the evaporator at this higher room temperature, the boiler-absorber end temperature can be raised still further by means of which the refrigerant will be liberated from the manganese chloride in addition to that liberated from the strontium chloride and the strontium bromide duing the generating periods and be reabsorbed by the three absorbents during the corresponding absorbing periods.

This is illustrated in the diagram of Fig. 2 comprising two complete cycles of operation of the unit at a room temperature of about 40° C., one cycle for a normal load on the evaporator indicated by the legend "Normal" and the other cycle for a full load on the evaporator indicated by the legend "Abnormal." As in the case of the two cycles shown in Fig. 1, the heat input is different for the different cycles, namely, 220 watts per hour for the cycle at "Normal" loads indicated by the legend "220 W" and 440 watts per hour for the cycle at "Abnormal" loads indicated by the legend "440 W." When heated at the rate of 220 watts, the boiler-absorber temperature will rise to about 160° C. as indicated by line $e$ during each generating period and, alternately, the boiler-absorber temperature will drop to about 46° C. indicated by line $f$ during each absorbing period. For this boiler-absorber operating temperature range, the refrigerant combining with $SrCl_2$ and $SrBr_2$ will be liberated during the generating periods and be reabsorbed during the absorbing periods. When heated at the rate of 440 watts, the boiler-absorber temperature will rise to about 200° C. indicated by line $g$ during each generating period and, alternately, the boiler-absorber temperature will drop to about 46° C. indicated by line $h$ during each absorbing period, so that at this boiler-absorber operating temperature range the refrigerant combining with $SrCl_2$, $SrBr_2$ and $MnCl_2$ will be liberated during the generating periods and be reabsorbed during the absorbing periods.

It will thus be seen that by utilizing different absorbents and raising the boiler-absorber end temperature in the manner above mentioned, that the amount of refrigerant will correspond to the increased requirements for refrigeration. Consequently, the refrigeration unit will have a more or less uniform high efficiency or performance independent of the operating conditions.

It is to be noted that the curves plotted in Figs. 1 and 2 designate the temperature as measured at the outside shell of the boiler-absorber and do not represent the actual temperature of the absorbent-refrigerant mass inside the boiler-absorber.

As before stated, in view of the fact that the absorbent materials are poor heat conductors, the absorbents should be so splaced in the boiler-absorber that those having higher operating temperatures will be nearer to the heat source than those of lower operating temperatures.

Instead of employing different absorbents having respectively a plurality of operating temperatures, different absorbents may be employed having substantially the same operating temperatures in combination with one or more absorbents having different operating temperatures from said first named absorbents.

Referring to Figs. 3 and 4, I have shown an intermittent absorption refrigerating unit operating in accordance with the present invention and consisting of a primary circuit formed by a plurality of interconnected elements including boiler-absorber 30, air cooled condenser 31, refrigerant collecting vessel 32 and refrigerant evaporator shown in the form of a coil 33 in thermal transfer relation to an accumulator 34 operating to accumulate the cold produced intermittently during the operation of the unit to cool a thermally insulated space such as a refrigerator cabinet 35.

The boiler-absorber 30 contains a plurality of different absorbents and is adapted to be heated during the generating periods of the unit by any suitable means such as the electrical heating element 36 shown, or by any other well known direct or indirect heating system. During the absorbing periods of the unit, the boiler-absorber is adapted to be cooled by any well-known means, that shown in the drawings comprising a closed circuit conduit providing a vaporization-condensation heat transfer system for the circulation of the heat transferring medium in heat exchange relation with the boiler-absorber and including a jacket 37, air-cooled condenser 38, liquid collecting tank 39, and valve 40 controlling the circulation of the heat transferring medium through the system. Valve 40 is normally urged to open position but is adapted to be closed simultaneously with the application of heat to the boiler-absorber 30 as will later appear.

The heating periods and cooling periods of the unit may be controlled by any of the well-known devices hereinabove mentioned, that shown in the drawings comprising a clock mechanism 41 having an inner current-carrying member 42 (Fig. 4) and an outer circular current-carrying member 44, the former connected to the positive line 43 of the source of current, and the latter connected by lines 45 and 46 to the heating element 36 and the valve 40, respectively. The outer member 44 is provided with cut-out recesses 47 corresponding to the periods during which the heating element 36 is to be de-energiezd and thereby rendered inoperative to heat and the valve 40 also de-energized to permit the circulation of the heat transferring medium in heat exchange relation with the boiler-absorber to cool the latter. An arm 48 having a circuit-closing contact 49 bridging the space between the inner and outer members 42 and 44, is movable in clockwise direction by any suitable mechanism (not shown) to make and break the circuit to the heating element 36 and valve 40 and thereby determine the heating and cooling periods of the unit. In the arrangement shown, the clock mechanism 41 provides heating periods of two hours followed by cooling periods of two hours, but obviously any other arrangement may be employed to provide different heating periods and cooling periods and also different cooling periods relative to the corresponding heating periods.

The end temperature to which the boiler-absorber is heated during the generating periods of the unit is controlled by a rheostat including a resistance coil 50 and a movable contact 51 carried by a pivoted arm 52, coil 50 being connected to the negative line 53 of the current source and contact 51 being connected by current-carrying line 54 to the heating element 36. A spring loading device 55 adjustable by means of a threaded nut 56, operates to maintain the arm 52 normally in the position shown in Fig. 3, that is, with the contact 51 occupying a position on the coil 50 adjacent the highest resistance when the heat input to the boiler-absorber will be at the rate of 110 watts. The arm 52 is adapted to be rocked on its pivot in clockwise direction against the spring loading device 55 by one or the other or both of a pair of thermostat bellows 57 and 58, the former being responsive to the room or ambient air temperature by means of thermostat bulb 59, and the latter being responsive to the cabinet temperature or to the evaporator temperature by thermostat bulb 60.

The operation of the rheostat by the thermostat bellows 57 and 58 is believed obvious without further description, it being clear that with the parts adjusted by the spring loading device 55 for the normal operating conditions of the unit representing a normal room temperature and a predetermined temperature desired to be maintained in the cabinet 35, the arm 52 will occupy the position shown in Fig. 3, so that the heat input to the boiler-absorber 30 during the generating periods of the unit will be at the rate of 110 watts, when only the refrigerant combining with one of the absorbents will be maintained in circulation, that is, liberated from the said absorbent during the generating periods and reabsorbed during the corresponding absorbing periods. With a rise in cabinet temperature or a rise in room temperature, or both, the heat input will be increased proportionately to raise the boiler-absorber end temperature and correspondingly increase the amount of refrigerant maintained in circulation by placing the different absorbents in operation successively.

If, for example, strontium chloride, strontium bromide and manganese chloride are the different absorbents contained in the boiler-absorber 30, then for the normal operating conditions of the unit, only the refrigerant combining with strontium chloride will be liberated during the generating periods and be reabsorbed during the corresponding absorbing periods. As the contact 51 is moved across the coil 50 from the position shown in Fig. 3, say to an intermediate position, by bellows 57 in response to a rising ambient air temperature, or by bellows 58 in response to a rising cabinet temperature, or by both bellows 57 and 58, a gradually increasing amount of refrigerant combining with strontium bromide will be circulated to supplement that combining with strontium chloride.

Upon a further rise in cabinet temperature or ambient air temperature or both, a correspondingly increasing amount of refrigerant combining with manganese chloride will be circulated to supplement that combining with strontium chloride and strontium bromide. Thus, the amount of refrigerant circulated varies and will correspond to the amount of refrigeration required so that the high efficiency of the unit is maintained substantially constant for the different operating conditions.

While I have described my invention in connection with a refrigerator cooled by a single intermittent absorption unit, the invention is equally applicable to refrigerators cooled by two or more units working in phase relation to each other to produce substantially continuous refrigeration. Moreover, although ammonia and methylamine have been mentioned specifically as suitable refrigeration fluids, obviously other known refrigerants may be employed in combination with any suitable solid absorbents.

Although I have shown only one boiler-absorber containing the different absorbents, each of the absorbents may be contained in a separate boiler-absorber in fluid communication with a common evaporator or separate evaporating systems within the scope of the invention, and when so used, the separate evaporating system operating as a unit with the corresponding boiler-absorbers.

From the foregoing it is believed that the operation and advantages of my invention will be readily understood by those skilled in the art without further description, it being borne in mind that numerous changes may be made in the details disclosed without departing from the spirit of the invention as set out in the following claims:

What I claim is:

1. An absorption refrigerating system comprising a generator-absorber unit having a plurality of distinct bodies of solid absorbent, each body being made up of absorbent different from the absorbent constituting the other bodies and each having a substantially different operating temperature range within which it is capable of liberating and absorbing the refrigerant, an evaporator connected to the generator-absorber unit to receive refrigerant liberated from the absorbent during the generation stage and to effect refrigeration by evaporation of liquid refrigerant therein during the absorption stage, a source of heat for heating said bodies of solid absorbent, and means for varying the supply of heat from said source of heat to said bodies of solid absorbent, within the full range of said plurality of different temperature ranges, in response to the demand for refrigeration.

2. In a refrigeration system of the intermittent absorption type, the combination of combined generating and absorbing means adapted to be heated and cooled during the generating and absorbing periods, respectively, of the system for circulation of a refrigeration fluid, and a plurality of solid absorbents in said combined generating and absorbing means having respectively different operating temperatures with respect to the liberation and re-absorption of said refrigeration fluid, said solid absorbents being so arranged in said combined generating and absorbing means that the absorbents of higher operating temperatures are closer to the heat source than the absorbent or absorbents of lower operating temperature.

NILS ERLAND AF KLEEN.

REFERENCES CITED

The following references are of record in the file of this patent:

UNITED STATES PATENTS

| Number | Name | Date |
| --- | --- | --- |
| 1,698,847 | Keyes | Jan. 15, 1929 |
| 1,705,483 | Keyes | Mar. 19, 1929 |
| 1,791,515 | Smith | Feb. 10, 1931 |
| 1,908,413 | Elfving | May 9, 1933 |
| 1,913,869 | Bichowsky | June 13, 1933 |
| 1,961,890 | Miller et al. | June 5, 1934 |
| 1,977,496 | Hulse et al. | Jan. 22, 1935 |
| 1,992,745 | Elfving | Feb. 26, 1935 |
| 2,041,741 | Bichowsky | May 26, 1936 |
| 2,087,939 | Sarnmark | July 27, 1937 |
| 2,088,277 | Normelli | July 27, 1937 |
| 2,131,119 | Root | Sept. 27, 1938 |
| 2,224,053 | Johnson | Dec. 3, 1940 |

FOREIGN PATENTS

| Number | Country | Date |
| --- | --- | --- |
| 520,977 | Great Britain | May 8, 1940 |

Certificate of Correction

Patent No. 2,496,459                                          February 7, 1950

NILS ERLAND AF KLEEN

It is hereby certified that errors appear in the printed specification of the above numbered patent requiring correction as follows:

Column 6, line 22, for "splaced" read *placed*; column 8, line 39, for the word "system" read *systems*; column 10, line 7, list of references cited, for the patent number "1,977,496" read *1,988,496*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*